(12) United States Patent
Hattori et al.

(10) Patent No.: US 7,619,839 B2
(45) Date of Patent: Nov. 17, 2009

(54) LENS BARREL AND IMAGE CAPTURING APPARATUS

(75) Inventors: Kazuhiro Hattori, Tokyo (JP); Hiroyuki Mori, Kanagawa (JP)

(73) Assignee: Sony Corporation (JP)

( * ) Notice: Subject to any disclaimer, the term of this patent is extended or adjusted under 35 U.S.C. 154(b) by 74 days.

(21) Appl. No.: 11/825,127

(22) Filed: Jul. 3, 2007

(65) Prior Publication Data

US 2008/0024888 A1 Jan. 31, 2008

(30) Foreign Application Priority Data

Jul. 5, 2006 (JP) ............................ P2006-185384

(51) Int. Cl.
*G02B 7/02* (2006.01)
(52) U.S. Cl. ................... 359/819; 359/822; 359/823
(58) Field of Classification Search ......... 359/694–701, 359/819–823
See application file for complete search history.

(56) References Cited

U.S. PATENT DOCUMENTS

| | | | | |
|---|---|---|---|---|
| 4,961,635 | A * | 10/1990 | Kondo et al. ................ | 359/701 |
| 6,987,930 | B2 * | 1/2006 | Nomura ...................... | 396/73 |
| 7,010,224 | B2 * | 3/2006 | Nomura ...................... | 396/85 |
| 7,031,603 | B2 * | 4/2006 | Nomura ...................... | 396/72 |

FOREIGN PATENT DOCUMENTS

| | | |
|---|---|---|
| JP | 59-135405 A | 8/1984 |
| JP | 60-49513 U | 4/1985 |
| JP | 60-49514 U | 4/1985 |
| JP | 63-095409 A | 4/1988 |
| JP | 3-210514 A | 9/1991 |
| JP | 7-34410 U | 6/1995 |
| JP | 2005-156934 A | 6/2005 |
| JP | 2006-119214 A | 5/2006 |
| JP | 2006-163072 A | 6/2006 |

OTHER PUBLICATIONS

Japanese Office Action issued on Jun. 12, 2008 in connection with corresponding Japanese Application No. 2006-185384 (3 pages).

* cited by examiner

*Primary Examiner*—Mohammed Hasan
(74) *Attorney, Agent, or Firm*—Lerner, David, Littenberg, Krumholz & Mentlik, LLP

(57) ABSTRACT

The present invention may provide a lens barrel which may include a guide shaft, and a movable lens frame. The barrel may be with an image capturing optical system disposed therein. The guide shaft may be disposed in the barrel and may extend parallel to the optical axis of the image capturing optical system. The movable lens frame may be reciprocally movable along the guide shaft in the barrel and holding lenses of the image capturing optical system. The barrel may include a wall supporting the guide shaft. The wall may include a light shield member projecting therefrom along the guide shaft in covering relation to a surface of the guide shaft which faces the optical axis.

12 Claims, 12 Drawing Sheets

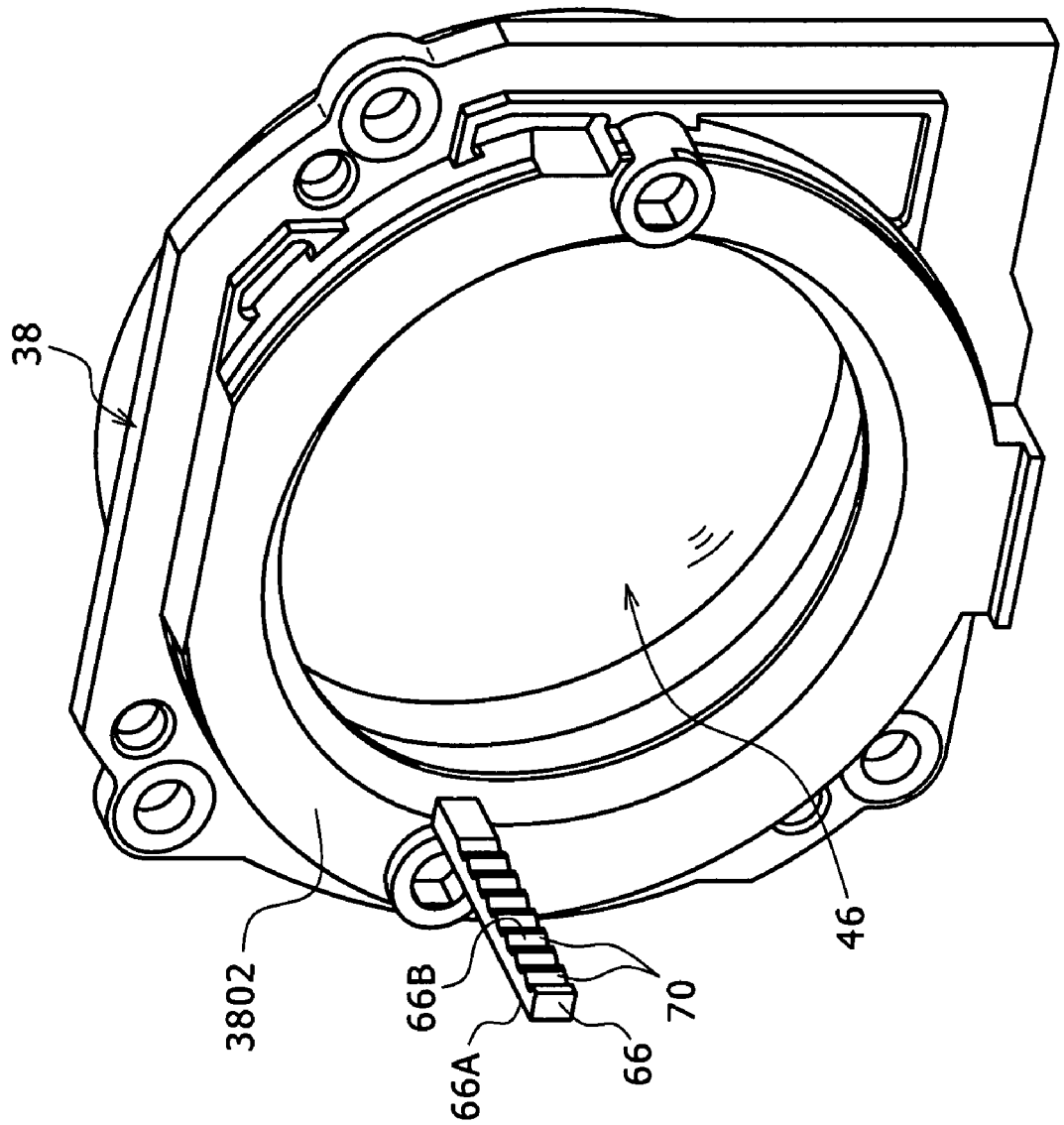

LENS BARREL AND IMAGE CAPTURING APPARATUS

CROSS-REFERENCE TO RELATED APPLICATIONS

This application claims priority from Japanese Patent Application No. JP 2006-185384 filed in the Japanese Patent Office on Jul. 5, 2006, the entire content of which is incorporated herein by reference.

BACKGROUND OF THE INVENTION

1. Field of the Invention

The present invention relates to a lens barrel and an image capturing apparatus.

2. Description of the Related Art

There are lens barrels to be incorporated in image capturing apparatus such as video cameras.

One such lens barrel includes a barrel with an image capturing optical system disposed therein, a guide shaft disposed in the barrel and extending parallel to the optical axis of the image capturing optical system, and a movable lens frame reciprocally movable along the guide shaft in the barrel and holding the lenses of the image capturing optical system. For details, reference should be made to Japanese Patent laid-open No. 2005-156934.

In most cases, the guide shaft is made of metal, and has its outer circumferential surface polished by barrel finishing for allowing the movable lens frame to move smoothly, the polished surface being liable to reflect light.

SUMMARY OF THE INVENTION

A light ray traveling in directions across the optical axis, of the light rays entering the image capturing optical system of the lens barrel, i.e., a light ray that has nothing to do with the formation of a subject image, is reflected by the outer circumferential surface of the guide shaft, travels to the image capturing apparatus, and is applied to the image capturing surface of the image capturing apparatus, producing ghosts and flares.

Particularly, if the distance between the guide shaft and the optical axis is reduced in order to reduce the size of the lens barrel, then the guide shaft tends to reflect more light rays, which cause more noticeable ghosts and flares to be generated.

It may be desirable to provide a lens barrel and an image capturing apparatus which can be reduced in size and are effective to prevent ghosts and flares.

According to an embodiment of the present invention, a lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The barrel may include a wall supporting the guide shaft. The wall may include a light shield member projecting therefrom along the guide shaft in covering relation to a surface of the guide shaft which faces the optical axis.

According to an embodiment of the present invention, a lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The barrel may include a wall supporting the auxiliary guide shaft. The wall may include a light shield member projecting therefrom along the auxiliary guide shaft in covering relation to a surface of the auxiliary guide shaft which faces the optical axis.

According to an embodiment of the present invention, a lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The movable lens frame may include a light shield member projecting therefrom along the guide shaft in covering relation to a surface of the guide shaft which faces the optical axis.

According to an embodiment of the present invention, a lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The movable lens frame may include a light shield member projecting therefrom along the guide shaft in covering relation to a surface of the guide shaft which faces the optical axis.

According to an embodiment of the present invention, a lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The barrel may include a wall supporting the guide shaft. The wall may include a first light shield member projecting therefrom along the guide shaft in covering relation to a surface of the guide shaft which faces the optical axis. The movable lens frame may include a second light shield member projecting therefrom along the guide shaft in covering relation to a surface of the guide shaft which faces the optical axis at a position different from the first light shield member.

According to an embodiment of the present invention, a lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The barrel may include a wall supporting the auxiliary guide shaft. The wall may include a first light shield member projecting therefrom along the auxiliary guide shaft in covering relation to a surface of the auxiliary guide shaft which faces the optical axis. The movable lens frame includes a second light shield member projecting therefrom along the auxiliary guide shaft in covering relation to a surface of the auxiliary guide shaft which faces the optical axis at a position different from the first light shield member.

According to an embodiment of the present invention, an image capturing apparatus may include a lens barrel. The lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The barrel may include a wall supporting the guide shaft. The wall may include a light shield member projecting therefrom along the guide shaft in covering relation to a surface of the guide shaft which faces the optical axis.

According to an embodiment of the present invention, an image capturing apparatus may include a lens barrel. The lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The barrel may include a wall supporting the auxiliary guide shaft. The wall may include a light shield member projecting therefrom along the auxiliary guide shaft in covering relation to a surface of the auxiliary guide shaft which faces the optical axis.

According to an embodiment of the present invention, an image capturing apparatus may include a lens barrel. The lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The movable lens frame may include a light shield member projecting therefrom along the guide shaft in covering relation to a surface of the guide shaft which faces the optical axis.

According to an embodiment of the present invention, an image capturing apparatus may include a lens barrel. The lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The movable lens frame may include a light shield member projecting therefrom along the guide shaft in covering relation to a surface of the guide shaft which faces the optical axis.

According to an embodiment of the present invention, an image capturing apparatus may include a lens barrel. The lens barrel may include a barrel with an image capturing optical system disposed therein, a guide shaft disposed in the barrel and extending parallel to the optical axis of the image capturing optical system, and a movable lens frame reciprocally movable along the guide shaft in the barrel and holding lenses of the image capturing optical system. The barrel may include a wall supporting the guide shaft. The wall includes a first light shield member projecting therefrom along the guide shaft in covering relation to a surface of the guide shaft which faces the optical axis. The movable lens frame may include a second light shield member projecting therefrom along the guide shaft in covering relation to a surface of the guide shaft which faces the optical axis at a position different from the first light shield member.

According to an embodiment of the present invention, an image capturing apparatus may include a lens barrel. The lens barrel may include a barrel with an image capturing optical system disposed therein, a main guide shaft and an auxiliary guide shaft disposed in the barrel and extending parallel to the optical axis of the image capturing optical system, and a movable lens frame reciprocally movable along the main guide shaft and the auxiliary guide shaft in the barrel and holding lenses of the image capturing optical system. The movable lens frame may include a coupling slidably connected to the main guide shaft, and an engaging portion engaging the auxiliary guide shaft for preventing the movable lens frame from rotating about the main guide shaft to which the coupling is connected. The barrel may include a wall supporting the auxiliary guide shaft. The wall may include a first light shield member projecting therefrom along the auxiliary guide shaft in covering relation to a surface of the auxiliary guide shaft which faces the optical axis. The movable lens frame may include a second light shield member projecting therefrom along the auxiliary guide shaft in covering relation to a surface of the auxiliary guide shaft which faces the optical axis at a position different from the first light shield member.

According to an embodiment of the present invention, since the light shield member may be capable of preventing a light ray from being reflected by the guide shaft, it may not be necessary to increase the distance between the guide shaft and the optical axis, as is the case with the conventional image capturing apparatus. Hence the lens barrel and the image capturing apparatus can be reduced in size while effectively preventing ghosts and flares from being produced.

BRIEF DESCRIPTION OF THE DRAWINGS

FIG. 11 is a perspective view of a first fixed lens frame according to a third embodiment of the present invention.

DETAILED DESCRIPTION

Embodiments of the present invention will be described below with reference to the accompanying drawings.

First Embodiment

Figure 1:
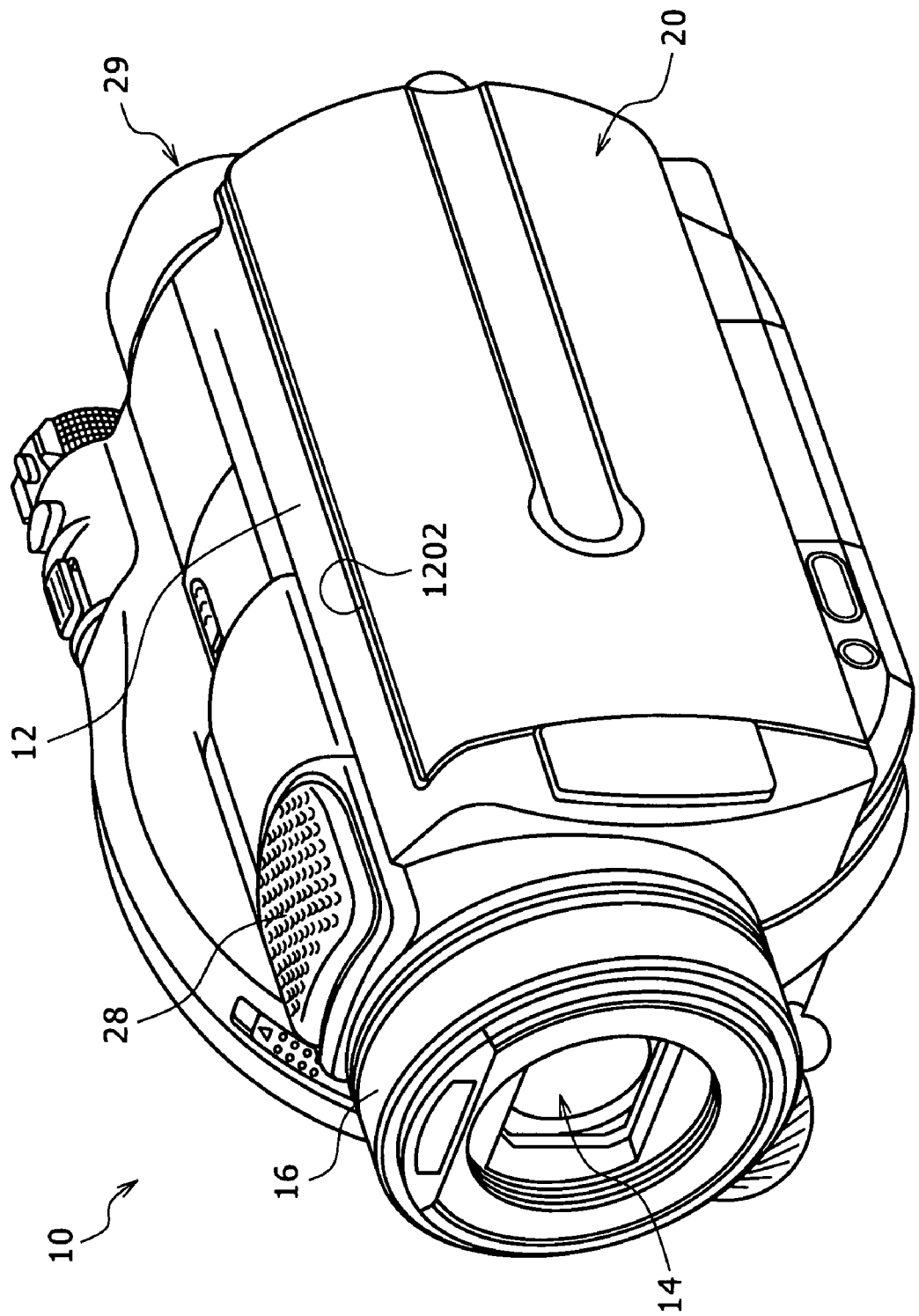
FIG. 1 is a perspective view of an image capturing apparatus according to a first embodiment of the present invention.
Figure 2:
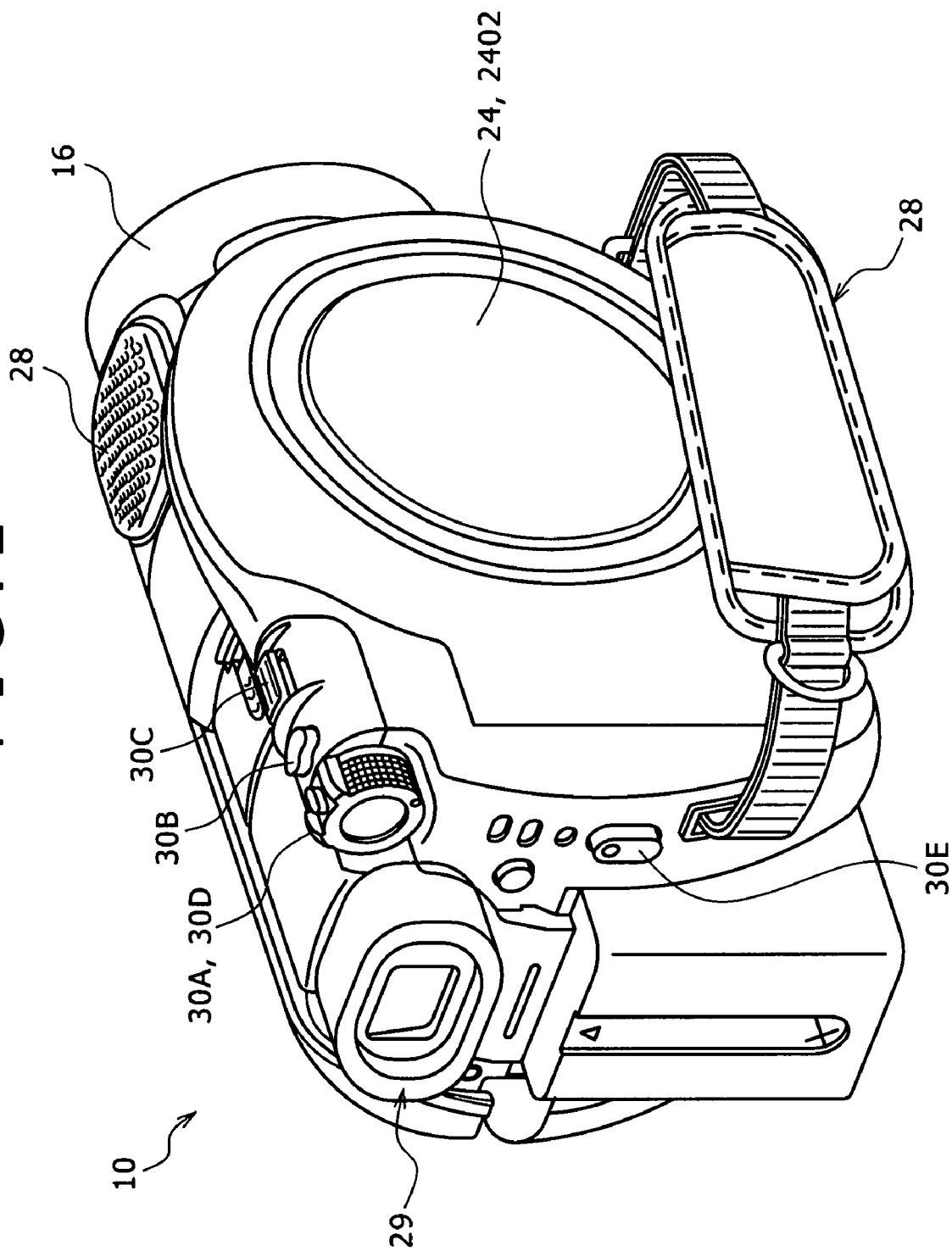
FIG. 2 is a perspective view of the image capturing apparatus according to the first embodiment of the present invention.
Figure 3:
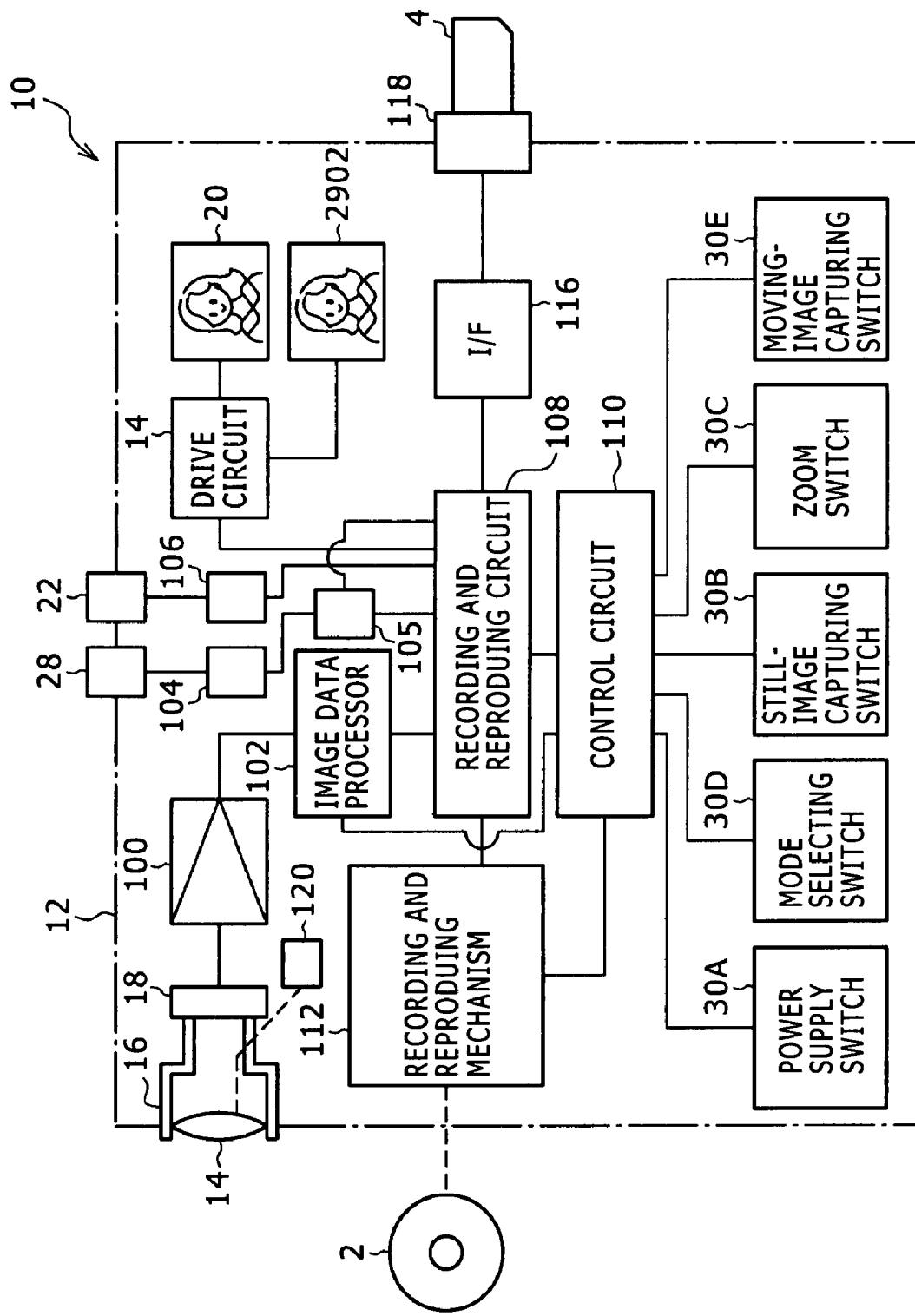
FIG. 3 is a block diagram of a control system of the image capturing apparatus according to the first embodiment of the present invention.

FIGS. 1 and 2 are perspective views of an image capturing apparatus 10 according to a first embodiment of the present invention, and FIG. 3 is a block diagram of a control system of the image capturing apparatus 10.

As shown in FIGS. 1 and 2, the image capturing apparatus 10 according to the first embodiment is constructed as a video camera.

The image capturing apparatus 10 includes a case 12 having longitudinal and vertical dimensions, i.e., a length and a height that are greater than a transverse dimension, i.e., a width, thereof. In the present specification, the terms "left" and "right" in the transverse directions of the image capturing apparatus 10 are used with respect to the image capturing apparatus 10 as viewed from behind. A subject side and an image capturing apparatus side along the optical axis of an optical system in the image capturing apparatus 10 refer to front and rear sides, respectively, in the longitudinal directions of the image capturing apparatus 10.

The image capturing apparatus 10 includes a lens barrel 16 disposed in an upper front portion of the case 12 and extending in the longitudinal directions of the image capturing apparatus 10. The lens barrel 16 incorporates an image capturing optical system 14 therein. The lens barrel 16 has a front portion disposed on a front face of the case 12.

An image capturing element 18 (see FIG. 3) for capturing a subject image generated by the image capturing optical system 14 is disposed in a rear end of the lens barrel 16.

As shown in FIG. 1, a display panel 20 including a liquid crystal display device, for example, for displaying a subject image captured by the image capturing element 18 is openably and closably hinged to a left side of the case 12. When the display panel 20 is closed, it is placed in a recess 1202 defined in the case 12. A speaker 22 (see FIG. 3) is mounted in a bottom wall of the recess 1202.

As shown in FIG. 2, the case 12 has a housing 24 disposed on a right side thereof and accommodating a removable disk-shaped recording medium 2 (see FIG. 3) for recording image data and audio data. The housing 24 can be opened and closed by a lid 2402.

A grip belt 26 extending in the longitudinal directions of the image capturing apparatus 10 is attached to the right side of the casing 12. A microphone 28 for picking up sounds is mounted on an upper front portion of the case 12.

An electronic viewfinder 29 incorporating a display panel 2902 (see FIG. 3) is mounted on an upper rear portion of the case 12.

As shown in FIG. 2, the image capturing apparatus 10 includes operating switches for performing various functions for capturing images, including a power supply switch 30A, a still image capturing switch 30B, a zoom switch 30C, a mode selecting switch 30D, and a moving image capturing switch 30E.

As shown in FIG. 3, the image capturing apparatus 10 has a control system including a video signal amplifying circuit 100, an image data processor 102, a microphone amplifying circuit 104, an audio data processing circuit 105, a speaker 22, an output amplifying circuit 106, a recording and reproducing circuit 108, a control circuit 110, a recording and reproducing mechanism 112, a drive circuit 114, an interface circuit 116, a memory card slot 118, and a zoom actuator 120.

An image capturing signal generated by the image capturing element 18 is amplified by the video signal amplifying circuit 100 and then supplied to the image data processor 102.

The image data processor 102 processes the image capturing signal to generate moving image data and still image data, which are supplied to the recording and reproducing circuit 108.

An audio signal that is generated by the microphone 28 is amplified by the microphone amplifying circuit 104 and processed by the audio data processing circuit 105 into audio data, which is supplied to the recording and reproducing circuit 108.

The recording and reproducing circuit 108 supplies the moving image data and the still image data which are supplied from the image data processor 102 and the audio data which is supplied from the audio data processing circuit 105, to the recording and reproducing mechanism 112 under the control circuit 110. The recording and reproducing mechanism 112 records the moving image data, the still image data, and the audio data on the disk-shaped recording medium 2. In the present embodiment, an optical disk such as a DVD-R is used as the disk-shaped recording medium 2. However, an optical disk other than a DVD-R or a magneto-optical disk may be used as the disk-shaped recording medium 2.

The recording and reproducing circuit 108 also records the moving image data and the still image data which are supplied from the image data processor 102 and the audio data which is supplied from the audio data processing circuit 105, through an interface circuit 116 into a memory card 4 that is mounted as a recording medium in the memory card slot 118.

The recording and reproducing circuit 108 supplies the moving image data and the still image data which are supplied from the image data processor 102 through the drive circuit 114 to the display panels 20, 2902, which display corresponding images.

The recording and reproducing circuit 108 supplies moving image data and still image data which are supplied form the memory card 4 through the interface circuit 116 through the drive circuit 114 to the display panels 20, 2902, which display corresponding images. The recording and reproducing circuit 108 also supplies audio data which is supplied form the memory card 4 through the interface circuit 116 through the output amplifying circuit 106 to the speaker 22, which outputs corresponding sounds.

The recording and reproducing circuit 108 supplies moving image data and still image data which are reproduced from the disk-shaped recording medium 2 by the recording and reproducing mechanism 112 through the drive circuit 114 to the display panels 20, 2902, which display corresponding images. The recording and reproducing circuit 108 also supplies audio data which is reproduced from the disk-shaped recording medium 2 by the recording and reproducing mechanism 112 through the output amplifying circuit 106 to the speaker 22, which outputs corresponding sounds.

The control circuit 110 turns on and off the power supply of the image capturing apparatus 10 in response to operation of the power supply switch 30A.

In response to operation of the still image capturing switch 30B, the control circuit 110 applies instructions to the image data processor 102 and the recording and reproducing circuit 108 to supply still image data from the image data processor 102 through the recording and reproducing circuit 108 to the recording and reproducing mechanism 112, which records the still image data in the disk-shaped recording medium 2. Stated otherwise, the still image capturing switch 30B functions as a shutter release button.

In response to operation of the zoom switch 30C, the control circuit 110 applies an instruction to the zoom actuator 120 to move first and second movable lens groups 48, 52 (see FIG. 5) of the image capturing optical system 14 for thereby changing the zooming ratio of the image capturing optical system 14.

In response to operation of the mode selecting switch 30D, the control circuit 110 applies an instruction to the image data processor 102 to switch between a moving image capturing mode for generating moving image data with the image data processor 102 and a still image capturing mode for generating still image data with the image data processor 102.

In the moving image capturing mode, the moving image data generated by the image data processor 102 is recorded through the recording and reproducing circuit 108 into the disk-shaped recording medium 2 or the memory card 4. In the still image capturing mode, the still image data generated by the image data processor 102 is recorded through the recording and reproducing circuit 108 into the disk-shaped recording medium 2 or the memory card 4.

In response to operation of the moving image capturing switch 30E, the control circuit 110 starts and stops recording moving image data. Specifically, in response to operation of the moving image capturing switch 30E, the control circuit 110 applies instructions to the image data processor 102 and the recording and reproducing circuit 108 to start or stop supplying moving image data from the image data processor 102 through the recording and reproducing circuit 108 to the recording and reproducing mechanism 112, which starts or stops recording the moving image data in the disk-shaped recording medium 2. Stated otherwise, the moving image capturing switch 30E functions as an operating member for starting or stopping capturing images.

Structural details of the lens barrel 16 will be described below.

Figure 4:
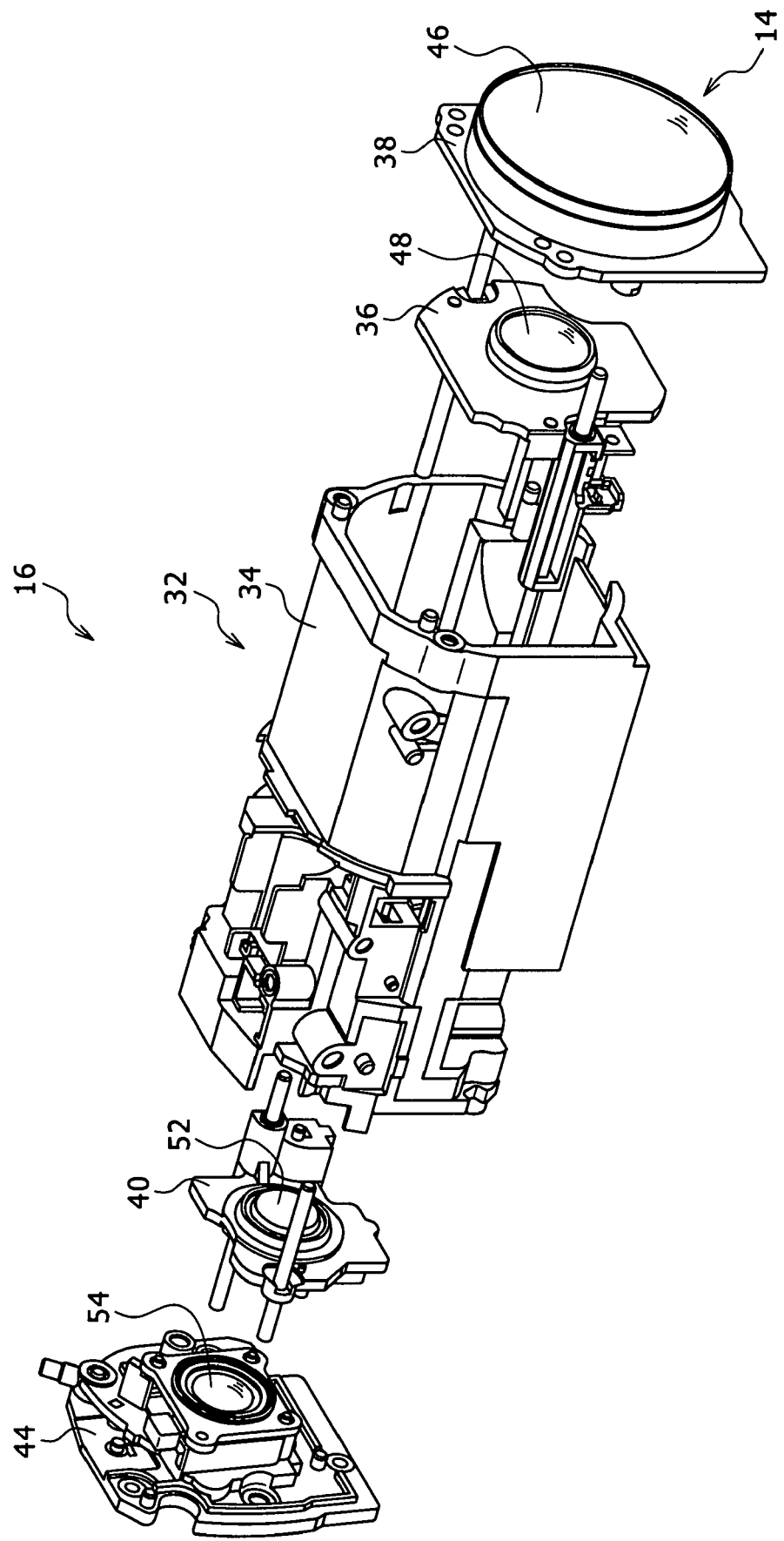
FIG. 4 is an exploded perspective view of a lens barrel incorporated in the image capturing apparatus according to the first embodiment of the present invention.
Figure 5:
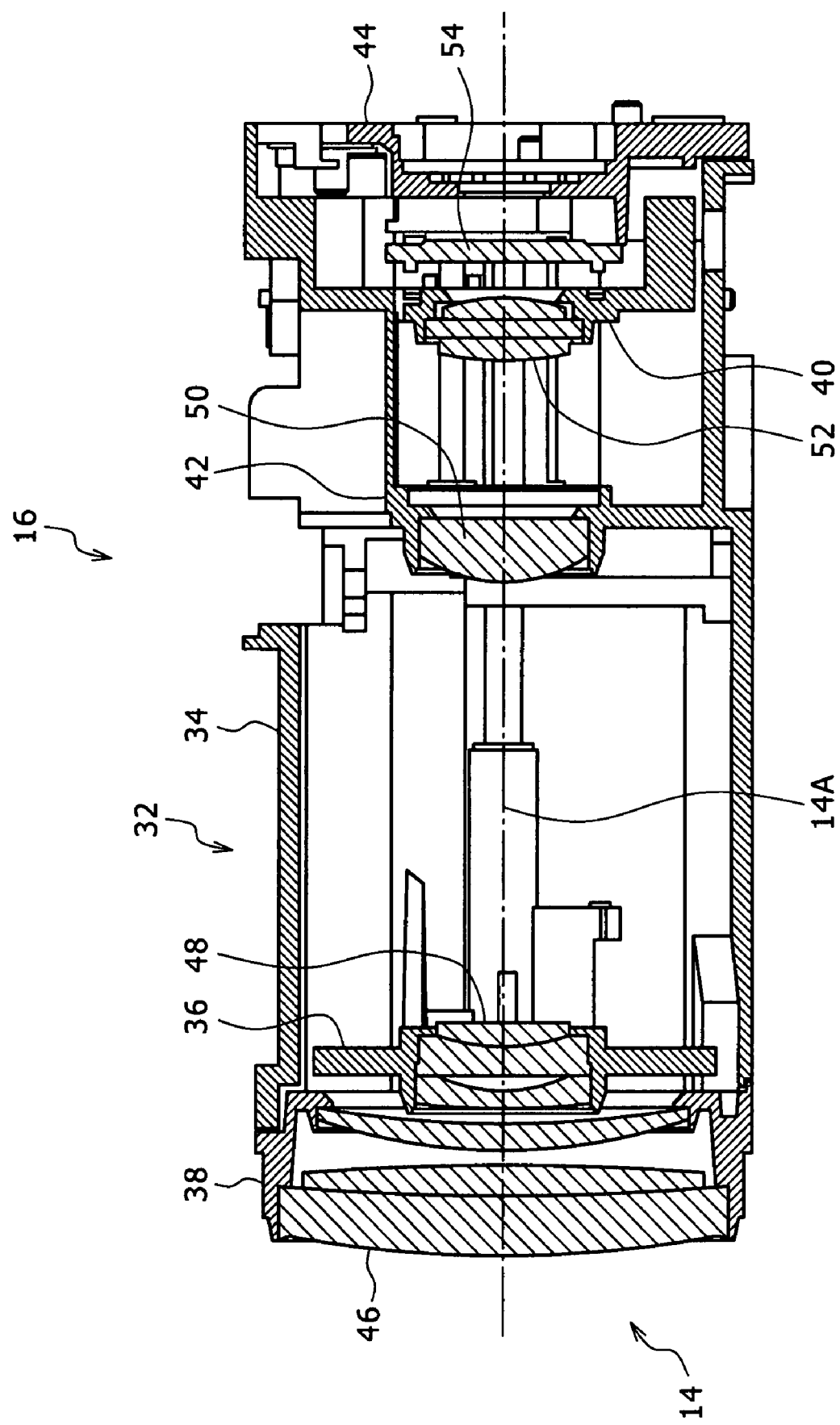
FIG. 5 is a cross-sectional view of the lens barrel.

FIG. 4 is an exploded perspective view of the lens barrel 16, and FIG. 5 is a cross-sectional view of the lens barrel 16.

As shown in FIGS. 4 and 5, the lens barrel 16 includes a barrel 32. The barrel 32 includes a barrel body 34, a first movable lens frame 36, a first fixed lens frame 38, a second movable lens frame 40, a second fixed lens frame 42, and a third fixed lens frame 44. The first movable lens frame 36 is disposed in a front portion of the barrel body 34. The first fixed lens frame 38 is mounted on a front end of the barrel body 34. The second movable lens frame 40 is disposed in a rear portion of the barrel body 34. The second fixed lens frame 42 is disposed forward of the second movable lens frame 40 in the barrel body 34 and fixedly mounted in the barrel body 34. The third fixed lens frame 44 is mounted on a rear end of the barrel body 34.

The image capturing optical system 14 includes a first fixed lens group 46, a first movable lens group 48, a second fixed lens group 50, a second movable lens group 52, and a third fixed lens 54 which are successively arranged in the order named from the front end toward the rear end along an optical axis 14A of the image capturing optical system 14. The first fixed lens group 46 is fixed to the first fixed lens frame 38. The first movable lens group 48 is fixed to the first movable lens frame 36. The second fixed lens group 50 is fixed to the second fixed lens frame 42. The second movable lens group 52 is fixed to the second movable lens frame 40. The third fixed lens 54 is fixed to the third fixed lens frame 44.

In the present embodiment, the image capturing optical system 14 is constructed as an inner focus lens assembly including the first and second movable lens groups 48, 52. The first fixed lens group 46, the second fixed lens group 50, and the third fixed lens 54 are fixed to the barrel 32 against movement along the optical axis 14A. The first movable lens group 48 and the second movable lens group 52 are movable along the optical axis 14A by an actuating mechanism, not shown.

The first movable lens group 48 and the second movable lens group 52 as they move along the optical axis 14A cooperate with each other in adjusting the focal length of the image capturing optical system 14 (zooming) and also adjusting the focal point of the image capturing optical system 14 (focusing).

Figure 6:
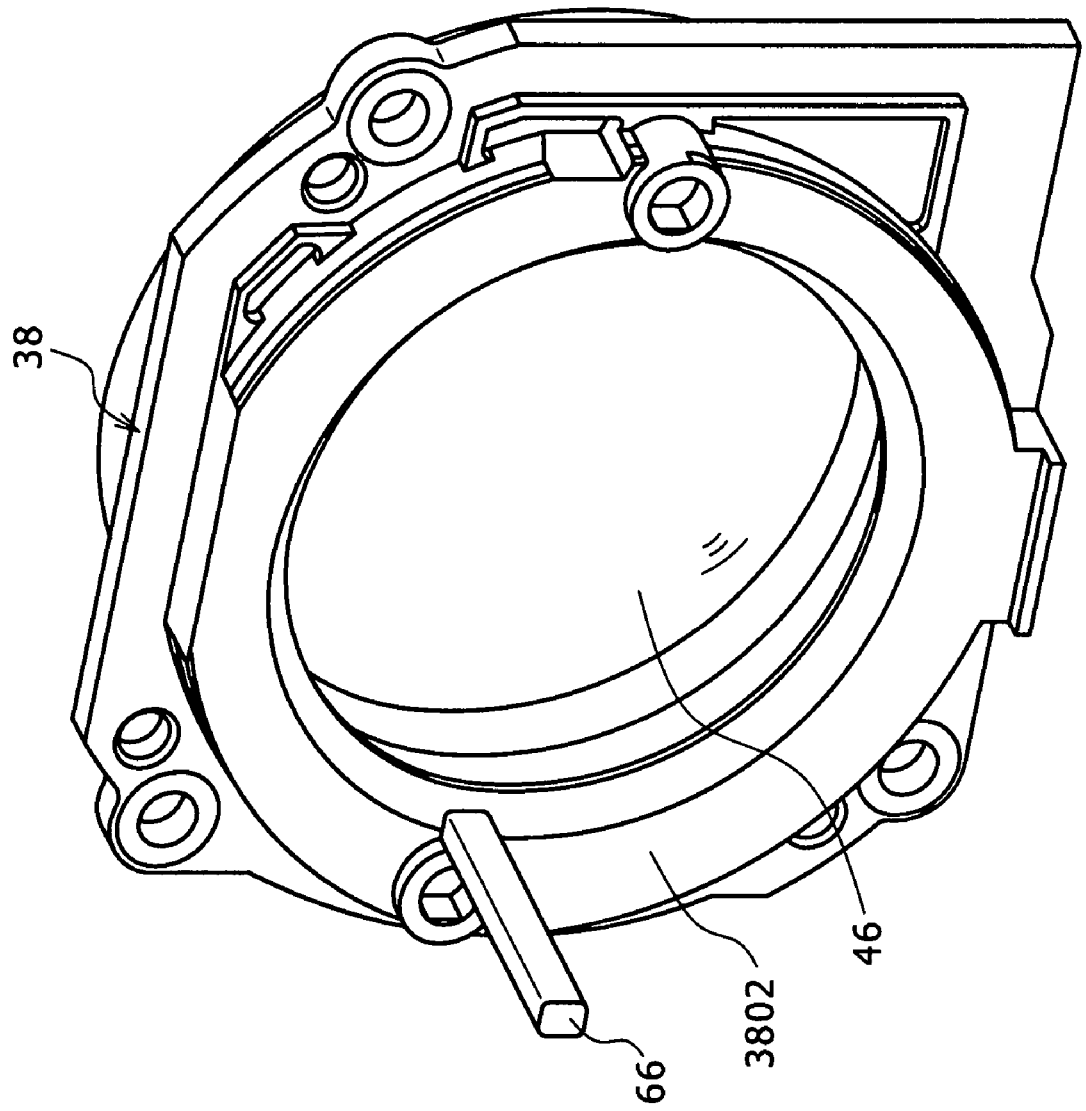
FIG. 6 is a perspective view of a first fixed lens frame of the lens barrel.
Figure 7:
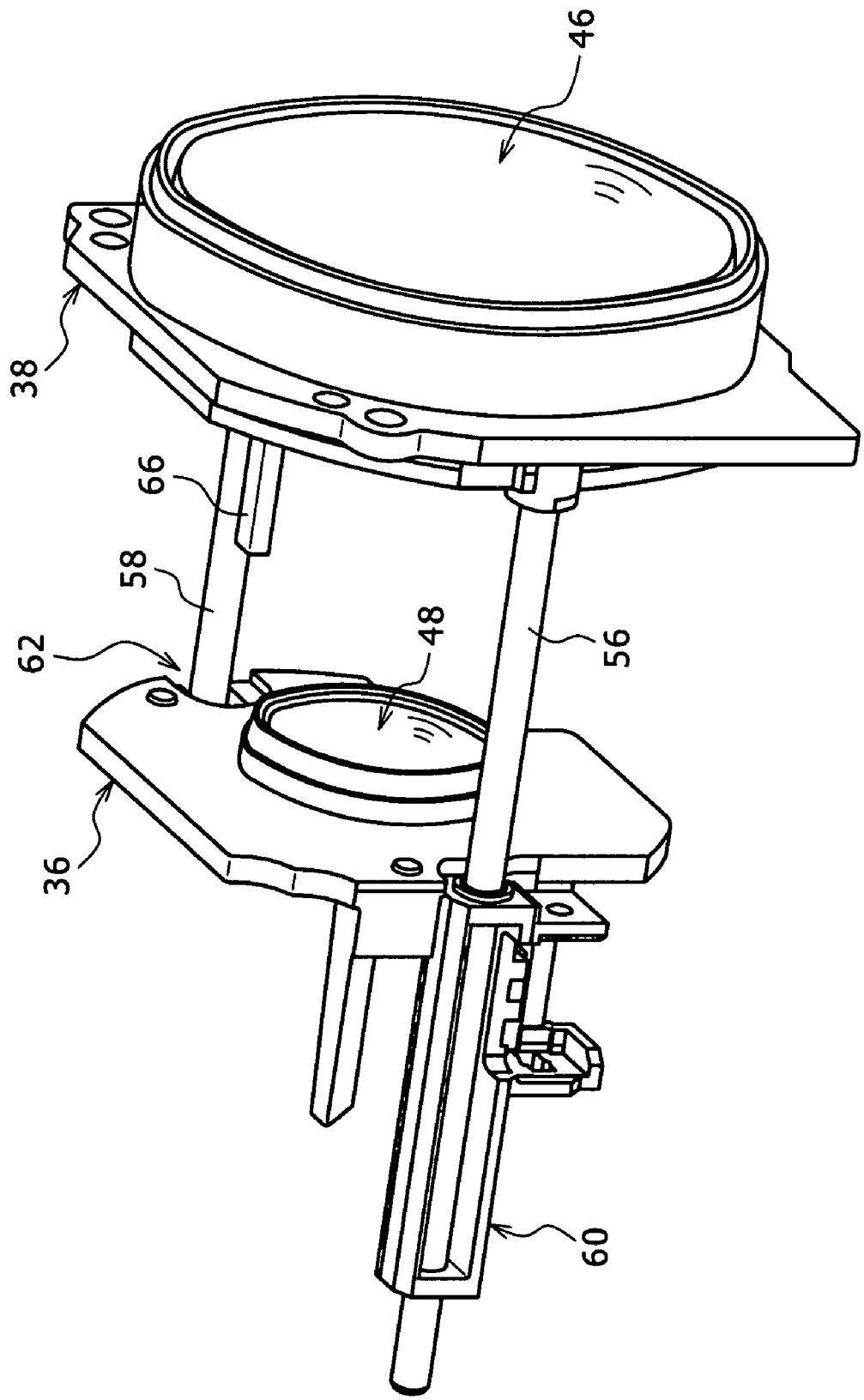
FIG. 7 is a perspective view of the first fixed lens frame and a first movable lens frame of the lens barrel.
Figure 8:
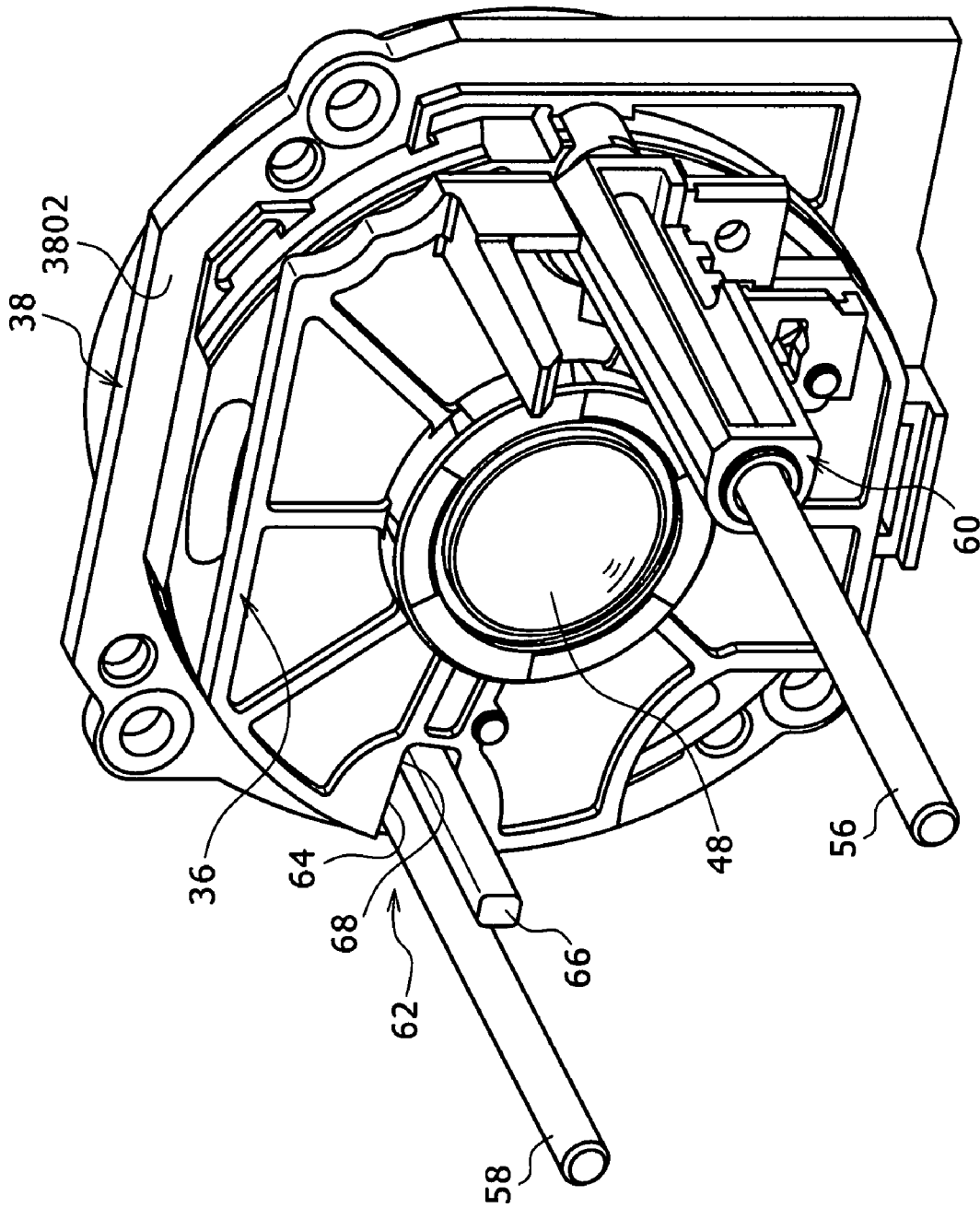
FIG. 8 is a perspective view of the first fixed lens frame and the first movable lens frame.
Figure 9:
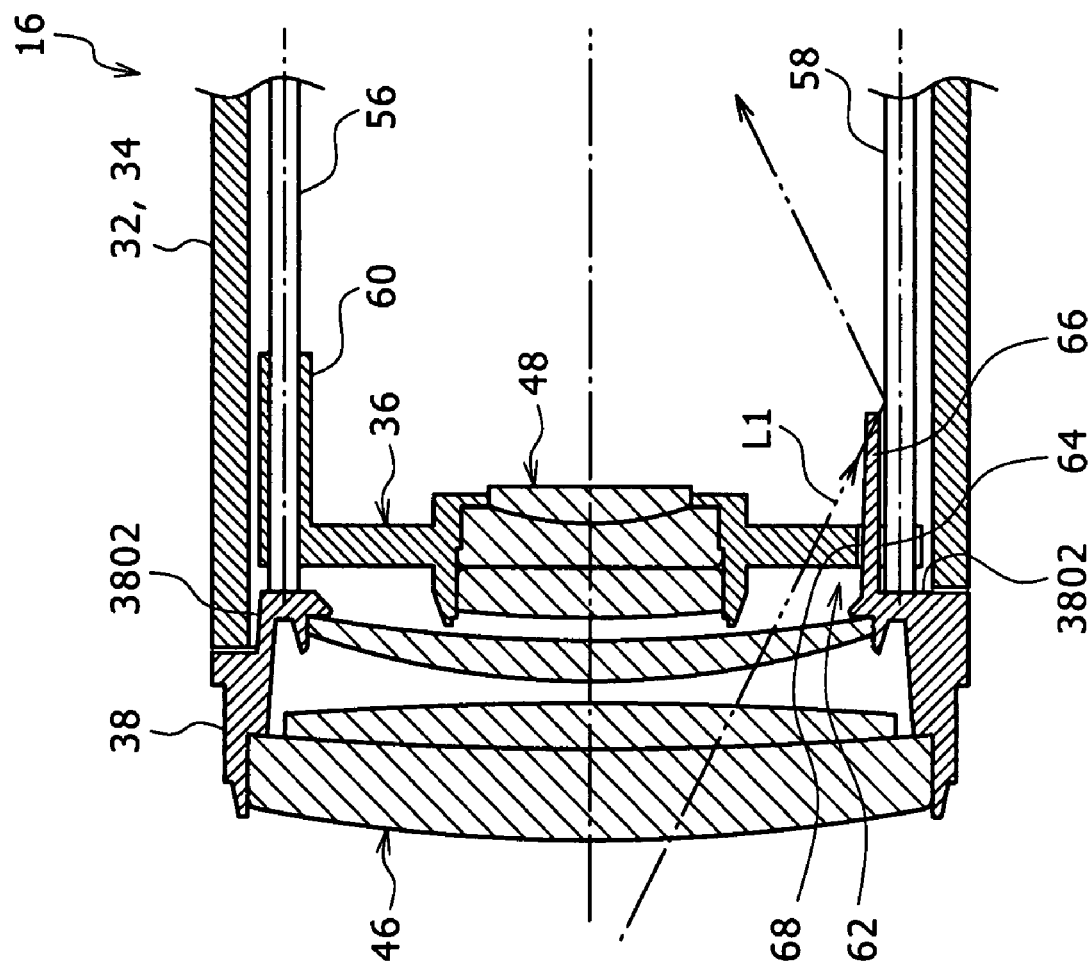
FIG. 9 is a cross-sectional view of a front portion of the lens barrel.

FIG. 6 is a perspective view of the first fixed lens frame 38, FIGS. 7 and 8 are perspective views of the first fixed lens frame 38 and the first movable lens frame 36, and FIG. 9 is a cross-sectional view of a front portion of the lens barrel 16.

A light shield structure according to the first embodiment will be described below with reference to FIGS. 6 through 9.

The first movable lens frame 36 are reciprocally movable along a main guide shaft 56 and an auxiliary guide shaft 58 by the non-illustrated actuating mechanism.

Specifically, the main guide shaft 56 and the auxiliary guide shaft 58 are disposed in the barrel 32 and extend parallel to the optical axis 14A. The main guide shaft 56 and the auxiliary guide shaft 58 have respective front ends supported by a wall 3802 of the first fixed lens frame 38 and respective rear ends supported on a wall (not shown) in the barrel body 34.

The main guide shaft 56 is slidably connected to, or specifically slidably extends through, a coupling sleeve 60 of the first movable lens frame 36.

The coupling sleeve 60 has a slender shape along the main guide shaft 56 to prevent the first movable lens frame 36 from wobbling, and includes bearings, for example.

The auxiliary guide shaft 58 engages an engaging portion 62 of the first movable lens frame 36 for preventing the first movable lens frame 36 from rotating about the main guide shaft 56 to which the coupling sleeve 60 is connected.

The engaging portion 62 includes an engaging groove 64 defined therein through which the auxiliary guide shaft 58 extends.

The main guide shaft 56 and the auxiliary guide shaft 58 are made of metal and have respective outer circumferential surfaces polished by barrel finishing for allowing the first movable lens frame 36 to move smoothly, the polished surfaces being liable to reflect light.

The main guide shaft 56 has a large portion concealed by the coupling sleeve 60, but most of the auxiliary guide shaft 58 is exposed in the barrel 32.

A light shield member 66 projects from the wall 3802 of the first fixed lens frame 38 and extends along the auxiliary guide shaft 58 in covering relation to a surface of the auxiliary guide shaft 58 which faces the optical axis 14A.

The first fixed lens frame 38 is made of synthetic resin such as polycarbonate, for example.

The light shield member 66 is integrally formed with the wall 3802 of the first fixed lens frame 38, and hence is made of synthetic resin.

The light shield member 66 is in the form of a band plate and extends with its longitudinal direction parallel to the auxiliary guide shaft 58 closely to the surface of the auxiliary guide shaft 58 which faces the optical axis 14A. One of transversely opposite surfaces of the light shield member 66 faces the auxiliary guide shaft 58, whereas the other of the transversely opposite surfaces of the light shield member 66 faces the optical axis 14A. According to the present embodiment, since the light shield member 66 extends closely to the surface of the auxiliary guide shaft 58 which faces the optical axis 14A with one of the transversely opposite surfaces facing the auxiliary guide shaft 58, the light shield member 66 is effective to prevent a light ray L1 (see FIG. 9) that has nothing to do with the formation of a subject image from reaching the outer circumferential surface of the auxiliary guide shaft 58.

The engaging portion 62 of the first movable lens frame 36 has a passage groove 68 defined therein for allowing the light shield member 66 to pass therethrough upon movement of the first movable lens frame 36 in order to avoid collision between the first movable lens frame 36 and the light shield member 66 when the first movable lens frame 36 moves. The passage groove 68 is joined to the engaging groove 64.

Operation and advantages of the image capturing apparatus 10 will be described below.

If the light shield member 66 is not provided in FIG. 9, then of the light rays that have passed through the first fixed lens group 46, a light ray L1 traveling in directions across the optical axis 14A, i.e., a light ray L1 that has nothing to do with the formation of a subject image, is reflected by the outer circumferential surface of the auxiliary guide shaft 58, travels to the image capturing element 18, and is applied to the image capturing surface of the image capturing element 18, producing ghosts and flares.

Such ghosts and flares may be prevented from occurring if the light ray L1 is guided in a direction off the image capturing element 18 by increasing the distance between the auxiliary guide shaft 58 and the optical axis 14A. However, the increased distance between the auxiliary guide shaft 58 and the optical axis 14A increases the dimension of the lens barrel 16 in directions perpendicular to the optical axis 14A, and hence the lens barrel 16 cannot be reduced in size.

According to the present embodiment, the light shield member 66 blocks the light ray L1 which travels toward the outer circumferential surface of the auxiliary guide shaft 58, and hence the light ray L1 does not impinge upon the outer circumferential surface of the auxiliary guide shaft 58. Consequently, ghosts and flares are prevented from occurring which would otherwise be produced when the light ray L1 is applied to the image capturing element 18.

Some light rays may be reflected by the surface of the light shield member 66 toward the image capturing element 18. However, since the light shield member 66 is made of synthetic resin, the reflectance of the surface of the light shield member 66 is much smaller than the reflectance of the outer circumferential surface of the auxiliary guide shaft 58. Therefore, any light rays that are reflected by the surface of the light shield member 66 toward the image capturing element 18 are very weak in intensity, and any adverse effects that are caused when such reflected light rays are applied to the image capturing element 18 are almost negligible.

According to the present embodiment, inasmuch as the light shield member 66 is effective to prevent light rays from being reflected by the auxiliary guide shaft 58, it is not necessary to increase the distance between the auxiliary guide shaft 58 and the optical axis 14A, and hence the lens barrel 16 and the image capturing apparatus 10 can be reduced in size while effectively preventing ghosts and flares from being produced.

According to the present embodiment, furthermore, since the light shield member 66 and the first fixed lens frame 38 are integrally formed with each other, the number of parts used to make up the image capturing apparatus 10 is reduced and so is the cost of the image capturing apparatus 10.

Second Embodiment

Figure 10:
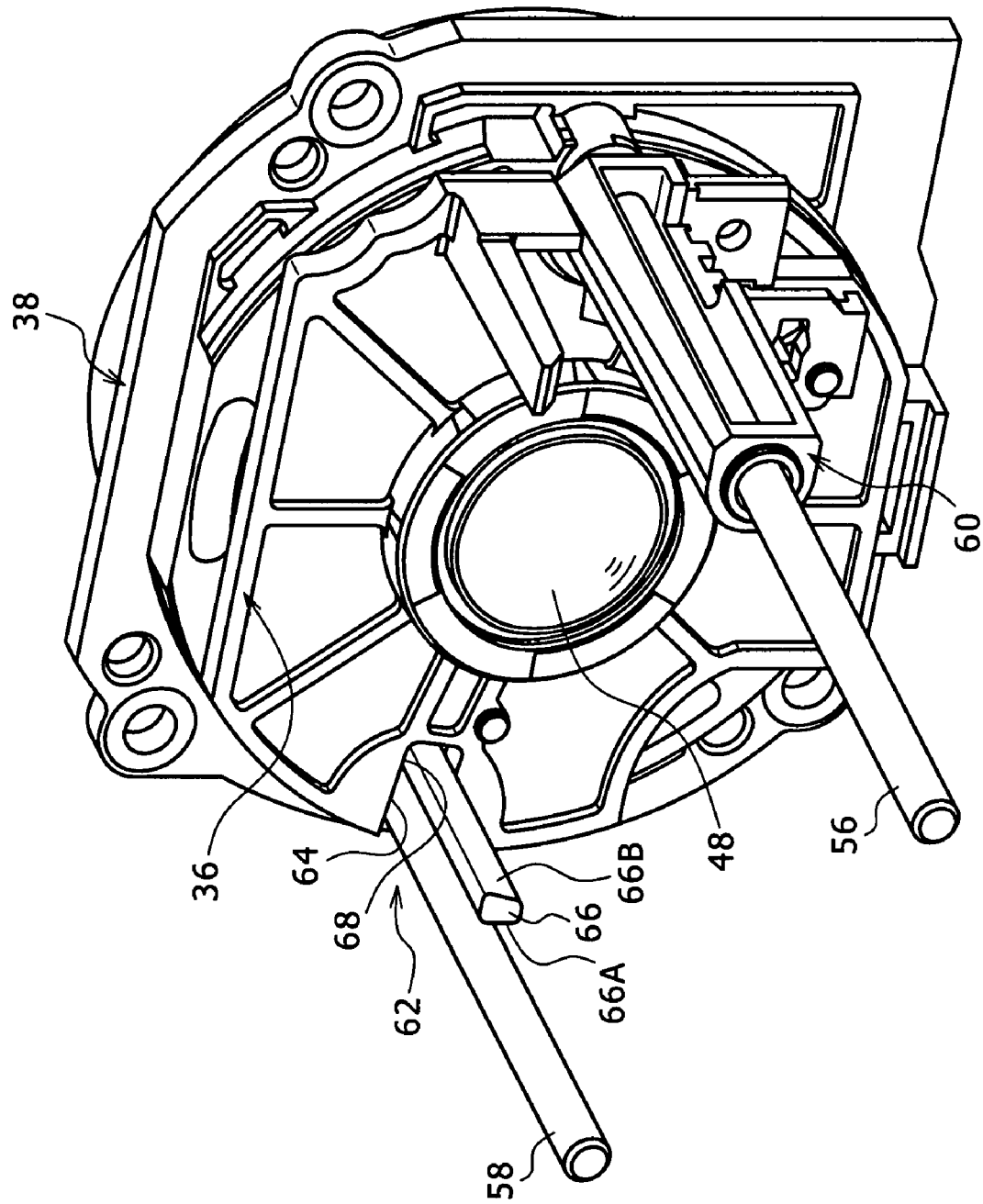
FIG. 10 is a perspective view of a first fixed lens frame and a first movable lens frame according to a second embodiment of the present invention.

FIG. 10 is a perspective view of a first fixed lens frame 38 and a first movable lens frame 36 according to a second embodiment of the present invention. Those parts of the second embodiment and subsequent embodiments which are identical to those of the first embodiment will be denoted by identical reference characters.

In the first embodiment, one of the transversely opposite surfaces of the light shield member 66 faces the auxiliary guide shaft 58, whereas the other of the transversely opposite surfaces of the light shield member 66 faces the optical axis 14A. In the second embodiment, as shown in FIG. 10, one 66A of the transversely opposite surfaces of the light shield member 66 extends perpendicularly to an imaginary line interconnecting the optical axis 14A of the image capturing optical system 14 and the axis of the auxiliary guide shaft 58, as with the first embodiment, and the other 66B of the transversely opposite surfaces of the light shield member 66 does not extend perpendicularly to the imaginary line, but extends obliquely across the imaginary line.

According to the second embodiment, the light ray L1 (see FIG. 9) that has reached the other surface 66B of the light shield member 66 is reflected thereby in a direction off the image capturing element 18. Therefore, the light shield member 66 according to the second embodiment is more effective to reduce the intensity of the light ray that is reflected by the light shield member 66 toward the image capturing element 18, thereby further reducing adverse effects that the reflected light ray has on the image capturing element 18.

Third Embodiment

FIG. 11 is a perspective view of a first fixed lens frame 38 according to a third embodiment of the present invention.

According to the third embodiment, as shown in FIG. 11, the light shield member 66 has a surface 66A facing the surface of the auxiliary guide shaft 58 which faces the optical axis 14A, a surface 66B which faces the optical axis 14A, and a plurality of anti-reflection slots 70 defined in the surface 66B.

The light ray L1 (see FIG. 9) that has reached the surface 66B of the light shield member 66 which faces the optical axis 14A is reflected in a direction off the image capturing element 18 by the anti-reflection slots 70 defined in the surface 66B. Therefore, as with the second embodiment, the light shield member 66 according to the third embodiment is more effective to reduce the intensity of the light ray that is reflected by the light shield member 66 toward the image capturing element 18, thereby further reducing adverse effects that the reflected light ray has on the image capturing element 18.

The surface 66B which faces the optical axis 14A may have an anti-reflection surface treatment instead of the anti-reflection slots 70. For example, such an antireflection surface treatment may be produced by any of various known anti-reflection techniques such as embossing and etching processes.

The surface 66B of the light shield member 66 according to the second embodiment may have the anti-reflection slots 70 according to the third embodiment, or may have an anti-reflection surface treatment. The surface 66B of the light shield member 66 according to the second embodiment which has the anti-reflection slots 70 or the anti-reflection surface treatment are much more effective to reduce the intensity of the light ray that is reflected by the light shield member 66 toward the image capturing element 18, thereby further reducing adverse effects that the reflected light ray has on the image capturing element 18.

Fourth Embodiment

Figure 12A:
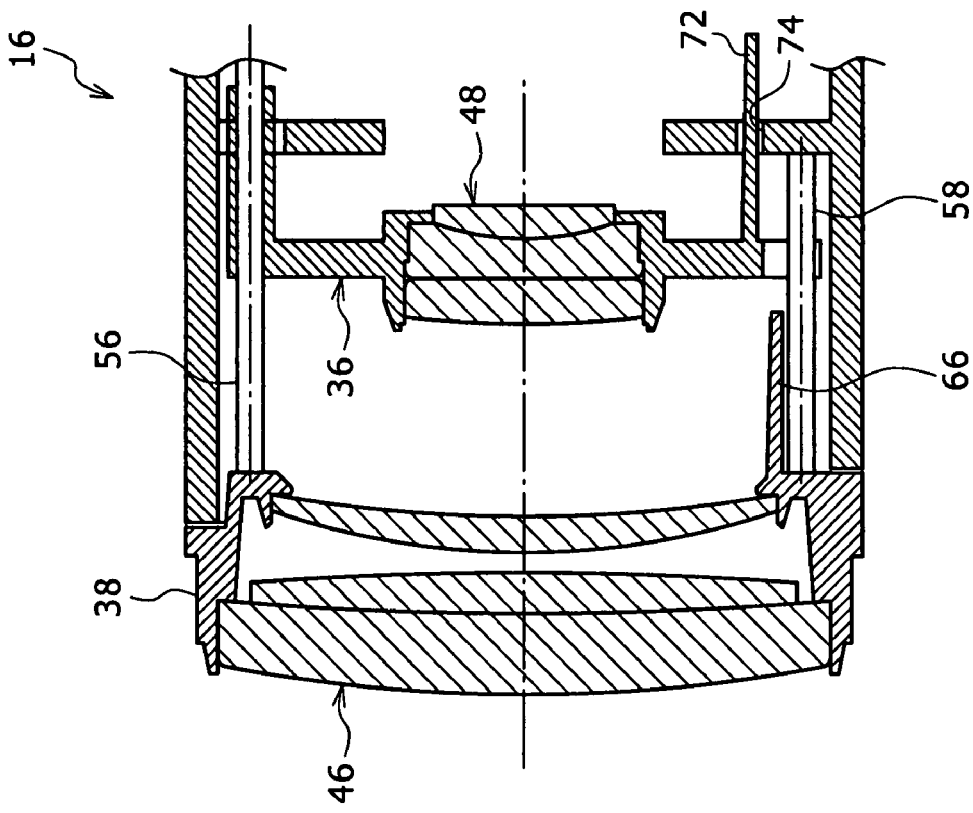
FIGS. 12A and 12B are cross-sectional views of a front portion of a lens barrel according to a fourth embodiment of the present invention.
Figure 12B:
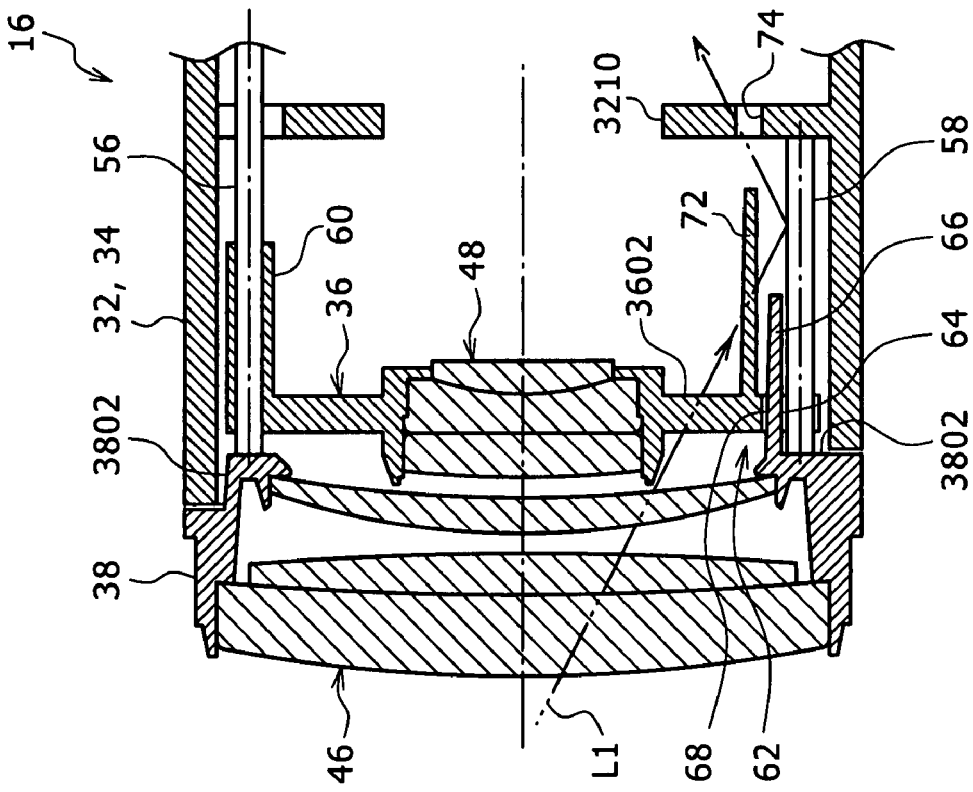

FIGS. 12A and 12B are cross-sectional views of a front portion of a lens barrel according to a fourth embodiment of the present invention. In FIG. 12A, the first movable lens frame 36 is shown as being positioned in a wide-angle end. In FIG. 12B, the first movable lens frame 36 is shown as being positioned in a telephoto end.

According to the fourth embodiment, the lens barrel 16 includes a light shield member 72 (second light shield member) on the first movable lens frame 36 that is movable along the main and auxiliary guide shafts 56, 58, as well as the light shield member 66 (first light shield member) on the first fixed lens frame 38.

The first movable lens frame 36 is made of synthetic resin such as polycarbonate, for example.

The light shield member 72 is integrally formed with a wall 3602 of the first movable lens frame 36, and hence is made of synthetic resin.

The light shield member 72 is in the form of a band plate and extends with its longitudinal direction parallel to the auxiliary guide shaft 58 along the surface of the auxiliary guide shaft 58 which faces the optical axis 14A at a position different from the light shield member 66. One of transversely opposite surfaces of the light shield member 72 faces the auxiliary guide shaft 58, whereas the other of the transversely opposite surfaces of the light shield member 66 faces the optical axis 14A. In the present embodiment, the light shield member 72 is disposed remoter from the auxiliary guide shaft 58 than the light shield member 66, so that the light shield members 66, 72 are prevented from impinging upon each other.

According to the present embodiment, since the light shield member 72 extends from the first movable lens frame 36 along the surface of the auxiliary guide shaft 58 which faces the optical axis 14A with one of the transversely opposite surfaces facing the auxiliary guide shaft 58, the light shield member 72 is effective to prevent the light ray L1 that has nothing to do with the formation of a subject image from reaching the outer circumferential surface of the auxiliary guide shaft 58.

The barrel 32 has a wall 3210 supporting the auxiliary guide shaft 58. The wall 3210 has a passage groove 74 defined therein for allowing the light shield member 72 to pass therethrough upon movement of the first movable lens frame 36.

When the first movable lens frame 36 is positioned in the wide-angle end as shown in FIG. 12A, the first movable lens frame 36 is positioned closely to the rear surfaces of the first fixed lens frame 38 and the first fixed lens group 46. Therefore, the light shield member 72 extends rearward from the first movable lens frame 36.

When the first movable lens frame 36 moves from the wide-angle end to the telephoto end shown in FIG. 12B, the light shield member 72 also moves in unison with the first movable lens frame 36, and both the light shield members 66, 72 are effective to prevent the light ray L1 that has nothing to do with the formation of a subject image from reaching the outer circumferential surface of the auxiliary guide shaft 58.

The fourth embodiment offers the same advantages as the first embodiment. In addition, the light shield members 66, 72 are effective to prevent the light ray L1 that has nothing to do with the formation of a subject image from reaching the outer circumferential surface of the auxiliary guide shaft 58 in a wide range where the auxiliary guide shaft 58 extends.

In the above embodiments, the movable lens frames are reciprocally movable along the main guide shaft and the auxiliary guide shaft. However, the guide mechanism for guiding the movable lens frames for their reciprocal movement is not limited to the illustrated embodiments. The embodiment of the present invention is applicable to a guide mechanism including a single guide shaft or three or more guide shafts.

In the above embodiments, the light shield member is integrally formed with the fixed lens frame of the barrel or integrally formed with the movable lens frame of the barrel. However, the light shield member may be formed separately from the fixed lens frame or the movable lens frame, and then mounted on the fixed lens frame or the movable lens frame. The light shield member constructed as illustrated in the above embodiments is effective to reduce the number of parts used and also to reduce the cost of the image capturing apparatus.

In the illustrated embodiments, the image capturing apparatus is constructed as a video camera. However, the embodiment of the present invention is also applicable to a digital still camera or any of various other image capturing apparatuses, and the lens barrel according to the embodiment of the present invention is applicable to any of various units and devices in addition to an image capturing apparatus incorporating a lens barrel.

Although certain preferred embodiments of the present invention have been shown and described in detail, it should be understood that various changes and modifications may be made therein without departing from the scope of the appended claims.

The invention claimed is:

1. A lens barrel comprising:
   a barrel with an image capturing optical system disposed therein;
   a main guide shaft and an auxiliary guide shaft disposed in said barrel and extending parallel to the optical axis of said image capturing optical system; and
   a movable lens frame reciprocally movable along said main guide shaft and said auxiliary guide shaft in said barrel and holding lenses of said image capturing optical system;
   wherein said movable lens frame includes
   a coupling slidably connected to said main guide shaft, and
   an engaging portion engaging said auxiliary guide shaft for preventing said movable lens frame from rotating about said main guide shaft to which the coupling is connected;
   wherein said barrel includes
   a wall supporting said auxiliary guide shaft, said wall including a light shield member projecting therefrom along said auxiliary guide shaft in covering relation to a surface of said auxiliary guide shaft which faces said optical axis.

2. The lens barrel according to claim 1, wherein said engaging portion includes a passage groove defined therein for allowing said light shield member to pass therethrough upon movement of said movable lens frame.

3. The lens barrel according to claim 1, wherein said light shield member includes an engaging groove with said auxiliary guide shaft engaging therein, said engaging portion including a passage groove defined therein for allowing said light shield member to pass therethrough upon movement of said movable lens frame, said passage groove being joined to said engaging groove.

4. The lens barrel according to claim 1, wherein said light shield member extends along said auxiliary guide shaft closely to the surface of said auxiliary guide shaft which faces said optical axis.

5. The lens barrel according to claim 1, wherein said auxiliary guide shaft includes a longitudinal end supported by said wall of said barrel.

6. The lens barrel according to claim 1, wherein said barrel is made of synthetic resin, and said light shield member is integrally formed with said wall.

7. A lens barrel comprising:
a barrel with an image capturing optical system disposed therein;
a main guide shaft and an auxiliary guide shaft disposed in said barrel and extending parallel to the optical axis of said image capturing optical system; and
a movable lens frame reciprocally movable along said main guide shaft and said auxiliary guide shaft in said barrel and holding lenses of said image capturing optical system;
wherein said movable lens frame includes
a coupling slidably connected to said main guide shaft, and
an engaging portion engaging said auxiliary guide shaft for preventing said movable lens frame from rotating about said main guide shaft to which the coupling is connected;
wherein said movable lens frame includes
a light shield member projecting therefrom along said guide shaft in covering relation to a surface of said guide shaft which faces said optical axis.

8. The lens barrel according to claim 7, wherein said barrel includes a wall supporting said guide shaft, said wall including a passage groove defined therein for allowing said light shield member to pass therethrough upon movement of said movable lens frame.

9. The lens barrel according to claim 7, wherein said movable lens frame is made of synthetic resin, and said light shield member being integrally formed with said movable lens frame.

10. The lens barrel according to claim 7, wherein said barrel includes a band plate, and said light shield member extends with a longitudinal direction thereof being parallel to said auxiliary guide shaft, and wherein said light shield member includes transversely opposite surfaces, one of said transversely opposite surfaces facing said auxiliary guide shaft and the other of said transversely opposite surfaces facing said optical axis.

11. A lens barrel comprising:
a barrel with an image capturing optical system disposed therein;
a guide shaft disposed in said barrel and extending parallel to the optical axis of said image capturing optical system; and
a movable lens frame reciprocally movable along said guide shaft in said barrel and holding lenses of said image capturing optical system;
wherein said barrel includes
a wall supporting said guide shaft, said wall including a first light shield member projecting therefrom along said guide shaft in covering relation to a surface of said guide shaft which faces said optical axis;
wherein said movable lens frame includes
a second light shield member projecting therefrom along said guide shaft in covering relation to a surface of said guide shaft which faces said optical axis at a position different from said first light shield member.

12. A lens barrel comprising:
a barrel with an image capturing optical system disposed therein;
a main guide shaft and an auxiliary guide shaft disposed in said barrel and extending parallel to the optical axis of said image capturing optical system; and
a movable lens frame reciprocally movable along said main guide shaft and said auxiliary guide shaft in said barrel and holding lenses of said image capturing optical system;
wherein said movable lens frame includes
a coupling slidably connected to said main guide shaft, and
an engaging portion engaging said auxiliary guide shaft for preventing said movable lens frame from rotating about said main guide shaft to which the coupling is connected;
wherein said barrel includes
a wall supporting said auxiliary guide shaft, said wall including a first light shield member projecting therefrom along said auxiliary guide shaft in covering relation to a surface of said auxiliary guide shaft which faces said optical axis;
wherein said movable lens frame includes
a second light shield member projecting therefrom along said auxiliary guide shaft in covering relation to a surface of said auxiliary guide shaft which faces said optical axis at a position different from said first light shield member.

* * * * *